Jan. 3, 1961 W. A. STUTSKE 2,966,997
CATHODE-RAY TUBE ENVELOPE
Filed Feb. 21, 1957

INVENTOR.
WILLIAM A. STUTSKE
BY W. A. SCHARN &
LEONARD D. SOUBIER
ATTORNEYS

United States Patent Office 2,966,997
Patented Jan. 3, 1961

2,966,997
CATHODE-RAY TUBE ENVELOPE

William A. Stutske, Toledo, Ohio, assignor to Kimble Glass Company, a corporation of Ohio Filed Feb. 21, 1957, Ser. No. 641,624

4 Claims. (Cl. 220—2.1)

The present invention relates to improvements in electron discharge tubes of the type suitable for television receivers and more particularly to tubes having primarily all-glass envelopes adaptable to both monochromatic and polychromatic television reception. The subject invention is especially applicable to cathode-ray tube bulbs which comprise a tubular glass shell in the form of a frustum of a cone or of a four-sided pyramidal frustum.

Heretofore, it has become the practice to construct a hermetically sealed cathode-ray tube envelope having a generally conical shape from composite hollow glass parts with relatively smooth sidewalls. The tube is formed by sealing an extensive glass face plate to a frusto-conical shaped glass funnel which tube is subject, when evacuated, to large forces on the face plate, funnel and the sealing area therebetween. The seal area in addition to being vacuum-tight must be capable of withstanding tremendous stress, both during processing and handling subsequent to face plate sealing, as well as when the tube is fully processed and placed in use. The seal area must be equally strong both during evacuation and when equalized atmospheric pressures are present both within and without the envelope to avoid tube failure.

The face plate on completion of sealing and evacuating is under inward radial compression tending to bow out or distend the side walls in the seal area which forces tend to establish undesirable tensile stresses therein. The ability of both the face plate and funnel to resist such enormous loading placed thereon when the tube is vacuumized must be designed into the tube structure to satisfactorily resist tube failure. It is known that forces exerted on the face plate tend to cause the tube to implode on failure and it is also against this tendency that the funnel side walls must be strengthened.

Heretofore, such strengthening has not been adequately incorporated into the funnel member and, when fabricated of glass, the funnel has played only a minor role in resisting tube failure with its gently curved side walls. Some of the deficiencies of a smoothly curved, generally conical glass funnel have consisted of maintaining dimensions on its larger end for face plate sealing and providing a complementary part as equally durable as the face plate. Seal failure has at times been attributed to weaknesses in the funnel member, particularly in its greater cross-sectional area.

It is, accordingly, an object of the present invention to provide an improved glass cathode-ray tube envelope fabricated of sealed hollow glass parts, which envelope is applicable to a tube having a large viewing screen, the envelope being reinforced in its seal area by the improved construction of a major component glass part.

Another object of the present invention is to provide a glass cathode-ray tube envelope fabricated of hollow glass parts which possess sealing surfaces capable of effecting a glass-to-glass hermetic seal which is not subject to distortion and/or failure under normal conditions of processing and use.

Another object of this invention is to provide an improved all-glass type enclosure for a cathode-ray television picture tube which is more resistant to sidewall variation in the seal area at both normal and evacuated pressures.

A still further object of this invention is to provide a funnel member for a cathode-ray tube envelope having an encompassing annular flange portion integrally formed as a portion of the sidewall at its larger end.

The specific nature of this invention, as well as other objects and advantages thereof, will become apparent to those skilled in the art from the following detailed description, taken in conjunction with the annexed sheet of drawings on which, by way of preferred example only, are illustrated the preferred embodiments of this invention.

Figure 1:
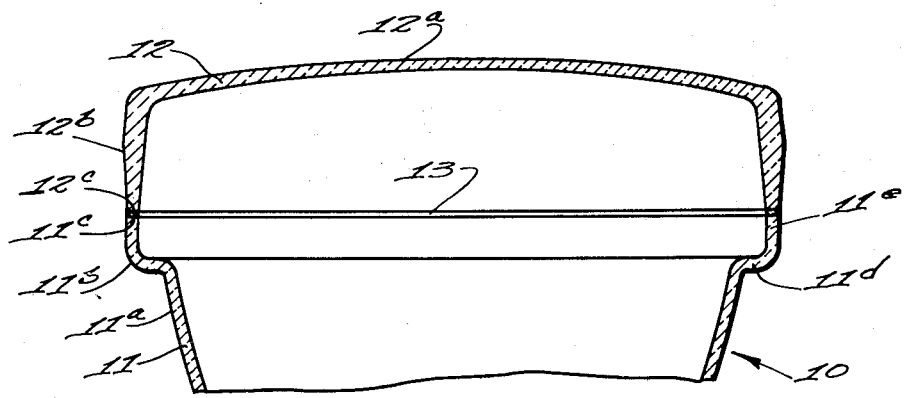
Fig. 1 is a fragmentary sectional view of an all-glass cathode-ray tube envelope embodying face plate and funnel members in accordance with my invention.
Figure 2:
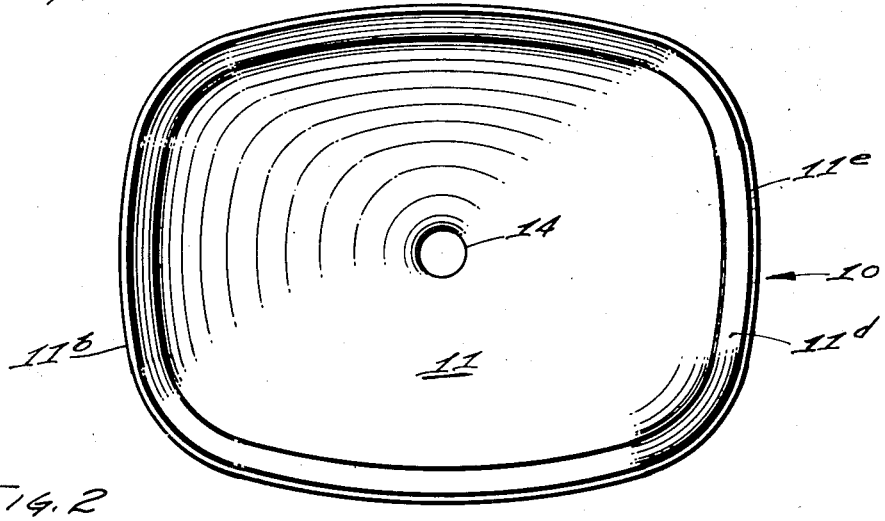
Fig. 2 is a plan view showing my improved tube construction as related to a so-called rectangular tube.

While this invention will be described as specifically applied to the manufacture of a cathode-ray tube, it will be apparent to those skilled in the art that the principles of the invention are equally applicable to the manufacture of any type of evacuated glass envelope formed by assembly of two or more preformed glass parts.

Referring now to the drawings in detail, a glass cathode-ray tube in a preferred embodiment has an envelope 10 which comprises a glass funnel 11 in the shape of a truncated cone to the large end of which is sealed a glass face plate 12. A glass neck designated by the numeral 14 is normally sealed to the other or small end of funnel 11 which is shown as a four-sided pyramidal frustum on the drawings. A single or multiple electron gun structure (not shown) of any known form is sealed in the neck 14 of the envelope 10 directed toward a fluorescent screen (not shown) disposed either adjacent to or on the interior surface of face plate 12. The neck, electron guns, and screen portions of the tube are conventional in the art and not the subject of this invention.

Face plate 12 is provided with a concavo-convex viewing area 12a in its central portion which is bounded by an annular peripheral flange 12b terminating in a planar sealing surface 12c. Face plate 12 is adaptable to transmitting light generated within the envelope.

Funnel 11 is provided with a frusto-conical shaped main body portion 11a and a flange portion 11b at its large end having a right-angled cross-sectional shape in one form, as shown in Fig. 1, the flange terminating in a planar sealing surface 11c in an area of greatest cross-sectional dimensions of said funnel. The sealing surfaces 11c and 12c are of complemental configuration for uniting either by hermetic welding or fusing. Surfaces 11c and 12c may be joined either by direct glass-to-glass fusion or by employing a layer 13 of low-melting glass sealing composition therebetween. Such low-melting sealant will normally facilitate sealing the component glass parts below their annealing or softening point temperatures without detrimental deformation or distortion thereof or of mounted internal hardware.

Flange 11b is comprised of outwardly and forwardly extending panel sections 11d and 11e which jointly constitute an enlarged truncated base or framing portion integrally united to the large end of main body portion 11a. Flange panel section 11d extends radially and transversely from the tube axis while panel section 11e extends forwardly nearly parallel to the tube axis terminating in planar sealing surface 11c, both sections having a uniform wall thickness nearly equal to that of the main body portion. Flange 11b has an overall shape which uniformly follows the periphery of the large funnel end. The dimensions of panel sections 11d and 11e are regulated so as to incorporate a strengthening rim into the large funnel end and the adjacent sealing area.

The width of annular panel section 11d is controlled so that its ring-like area perpendicular to the tube axis does not exceed 10 percent of the overall viewing area 12a of the face plate. By such control of the area of section 11d a diaphragm effect may be avoided which tends to cause variations in the overall tube length and thus deviations in critical distances between beam guns and their target area. Section 11e is preferably of relatively short length to locate section 11d as close to sealing surface 11c as practicable, however, sufficiently far removed to avoid thermal effects therein during thermal fusion of the joint.

As shown on Fig. 1, the widths of flange panel sections 11d and 11e may be nearly equi-dimensioned comprising a regular right-angle flange. The junction of sections 11d and 11e may be smoothly curved with a relatively short radius. The flange portion may be fabricated as an integral part of the funnel by common glass manufacturing procedures such as centrifugal spinning. Such practice has been fully described in Reynolds Patent No. 2,771,712, issued to the same assignee as the present application.

Figure 3:
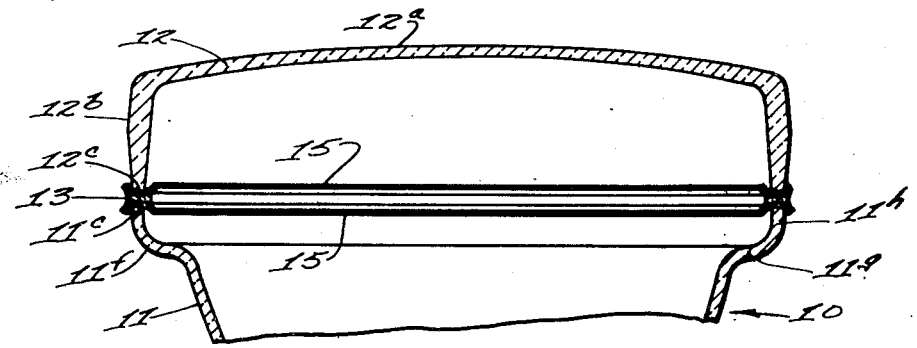
Fig. 3 is a view similar to Fig. 1 of a modification of the seal between the component glass parts.

In a modification of the present invention, as shown on Fig. 3, annular metal bands 15 are fusingly united to the sealing surfaces 11c and 12c of the funnel and face plate members respectively. Metal bands 15 have an arcuate cross-section and are oppositely disposed so that they may be joined in near tangential arrangement. A similar layer 13 of low-melting sealing composition is interposed therebetween to effect their hermetic sealing during final processing of the tube envelope 10.

Funnel 11 has a similar flange portion 11f at its large end which is formed of oppositely curved, tangentially joined portions of the tube sidewall extending outwardly and forwardly to comprise a uniformly curved enlarged base. Flange 11f consists of integrally formed, arcuate panel sections 11g and 11h, the latter of which terminates in planar sealing surface 11c. The centers of curvature of panel sections 11g and 11h lie in a line either parallel to the tube axis or diverging therefrom in the same direction as the funnel sidewalls. Panel sections 11g and 11h of the flange are similarly composed of glass having a relatively uniform thickness comparable to that of the funnel sidewalls. The width of the transverse annular area of panel section 11g is similarly limited to less than 10 percent of the viewing area 12a of the face plate.

Various modifications may be resorted to within the spirit and scope of the appended claims.

I claim:

1. An all-glass television picture tube envelope comprising a substantially funnel-shaped hollow glass body consisting essentially of funnel and flanged face plate members, the large end of said funnel member being approximately rectangular in shape and having said flanged face plate sealed thereto, said face plate and funnel members having complemental planar sealing surfaces normal to the envelope axis joined in hermetically sealed relation, said funnel member having frusto-conical smoothly curved flared sidewalls extending between its ends, said sidewalls being bowed outwardly between said ends, said funnel member having an annular strengthening rim portion adjacent its large rectangular end and providing its sealing surface, said rim portion being formed of radially and longitudinally extending sidewall panels of greater cross-sectional dimensions than and having a wall thickness substantially equal to the main body portion of said funnel.

2. The all-glass television picture tube envelope defined in claim 1, wherein the radially and longitudinally extending sidewall panels of said rim portion are disposed in essentially right-angled relationship, the area of said radial sidewall panel not exceeding 10% of the area of the viewing surface of said flanged face plate.

3. A television picture tube envelope comprising a substantially funnel-shaped hollow glass body consisting of funnel, neck, and flanged face plate members, the large end of said funnel being approximately rectangular in shape and having said flanged face plate sealed thereto, the small end of said funnel being approximately circular in shape and having said neck sealed thereto, said face plate and funnel members having complemental planar sealing surfaces normal to the tube axis joined in hermetically sealed relation, said funnel member having flared sidewalls extending between its ends, said funnel member having an annular strengthening rim portion adjacent its large rectangular end and providing its sealing surface, said rim portion being formed of oppositely curved tangentially joined panels of approximately equal radii, said panels extending radially and longitudinally having greater overall dimensions than the main body portion of said funnel, said panels having a thickness substantially equal to the main body portion of said funnel.

4. The television picture tube envelope defined in claim 3, wherein the radial centers of the oppositely curved and tangentially joined panels of said rim portion reside in a line essentially parallel to the tube axis, the surface area of said radially projecting panel not exceeding 10% of the viewing area of said face plate member.

References Cited in the file of this patent

UNITED STATES PATENTS

| | | |
|---|---|---|
| 2,232,098 | Deichman | Feb. 18, 1941 |
| 2,514,878 | Kuperus | July 11, 1950 |
| 2,643,020 | Dalton | June 23, 1953 |
| 2,691,457 | Longacre | Oct. 12, 1954 |
| 2,761,990 | Amdursky | Sept. 4, 1956 |
| 2,782,952 | Dalton et al. | Feb. 26, 1957 |
| 2,813,213 | Cramer | Nov. 12, 1957 |

FOREIGN PATENTS

| | | |
|---|---|---|
| 480,294 | Canada | Jan. 15, 1952 |